United States Patent
Kim et al.

(10) Patent No.: US 11,935,666 B2
(45) Date of Patent: Mar. 19, 2024

(54) APPARATUS FOR PURIFYING NUCLEAR REACTOR COOLANT FROM RADIOACTIVE MATERIALS AND ADJUSTING COOLANT PH

(71) Applicant: CELLGENTEK CO., LTD, Daejeon (KR)

(72) Inventors: Han Gun Kim, Gwangju-si (KR); Duk Yong Kim, Gwangju-si (KR); Hang Jun Kim, Jeollanam-do (KR)

(73) Assignee: CELLGENTEK CO., LTD, Daejeon (KR)

( * ) Notice: Subject to any disclaimer, the term of this patent is extended or adjusted under 35 U.S.C. 154(b) by 972 days.

(21) Appl. No.: 16/494,644

(22) PCT Filed: May 26, 2017

(86) PCT No.: PCT/KR2017/005540
§ 371 (c)(1),
(2) Date: Sep. 16, 2019

(87) PCT Pub. No.: WO2018/169130
PCT Pub. Date: Sep. 20, 2018

(65) Prior Publication Data
US 2020/0027614 A1 Jan. 23, 2020

(30) Foreign Application Priority Data
Mar. 16, 2017 (KR) .......................... 10-2017-0033117

(51) Int. Cl.
G21F 9/12 (2006.01)
G21C 19/307 (2006.01)
G21C 17/022 (2006.01)

(52) U.S. Cl.
CPC .............. *G21F 9/12* (2013.01); *G21C 19/307* (2013.01); *G21C 17/0225* (2013.01)

(58) Field of Classification Search
CPC ...... C22B 26/12; G21C 19/30; G21C 19/307; G21F 9/0007; G21F 9/04; G21F 9/06; G21F 9/12

(Continued)

(56) References Cited

U.S. PATENT DOCUMENTS 3,320,175 A * 5/1967 Podberesky .............. G21F 9/06
976/DIG. 380
2003/0000849 A1* 1/2003 Meintker ............. G21C 19/307
204/632

(Continued)

FOREIGN PATENT DOCUMENTS

EP 3065139 A1 9/2016
JP 2003-513253 A 4/2003

(Continued)

OTHER PUBLICATIONS

International Search Report for Corresponding International Application No. PCT/KR2017/005540 (2 Pages) (dated Dec. 13, 2017).

*Primary Examiner* — Jack W Keith
*Assistant Examiner* — Jinney Kil
(74) *Attorney, Agent, or Firm* — LEX IP MEISTER, PLLC

(57) ABSTRACT

Disclosed are an apparatus and a method for purifying $Li^7$ ions from reactor coolant radioactive material and adjusting pH of the reactor coolant. The apparatus comprises a radioactive metal ion recovery unit comprising a first negative electrode member having a negative (−) electrode connected thereto and a first positive electrode member having a positive (+) electrode connected thereto, and an Li ion separation/concentration unit. The radioactive metal ion recovery unit is configured such that the reactor coolant discharged from the non-generative heat exchanger passes between the first negative electrode member and the first positive electrode member The Li ion separation/concentration unit comprises a second positive electrode member having a second positive (+) electrode connected to one side of the Li ion separation/concentration unit, a second negative electrode member having a negative (−) electrode connected to the other side of the Li ion separation/concentration unit, and a cation-exchange membrane provided between the second positive electrode member and the second negative electrode member and configured to pass a cation therethrough. The Li ion separation/concentration unit is configured such that the reactor coolant that passed through the radioactive metal ion recovery unit passes between the second positive electrode member and the cation-exchange membrane Accordingly, $Li^7$ ions, produced (Continued)

in the reactor coolant and passed through the cation-exchange membrane, move toward the second negative electrode member and are separated. The apparatus further comprises an $Li^7$ concentration tank configured to concentrate $Li^7$ in a recycling process in which $Li^7$ separated from the Li ion separation/concentration unit is recycled again to the Li ion separation/concentration unit.

5 Claims, 4 Drawing Sheets

(58) Field of Classification Search
USPC .................................................. 376/310, 313
See application file for complete search history.

(56) References Cited

U.S. PATENT DOCUMENTS

| | | | | |
|---|---|---|---|---|
| 2009/0038961 A1* | 2/2009 | Denton | ............... | C02F 9/00 205/742 |
| 2009/0310733 A1* | 12/2009 | Kasahara | ............... | G21C 19/46 210/502.1 |
| 2016/0247589 A1 | 8/2016 | Miyamoto et al. | | |
| 2017/0294241 A1* | 10/2017 | Dodson | ............... | C23F 13/22 |

FOREIGN PATENT DOCUMENTS

| | | | |
|---|---|---|---|
| JP | 2004093149 | A | 3/2004 |
| JP | 2005-521867 | A | 7/2005 |
| JP | 2012013638 | A | 1/2012 |
| JP | 5558232 | B2 | 6/2014 |
| JP | 2014163843 | A | 9/2014 |
| JP | 2015-81381 | A | 4/2015 |
| JP | 2015-81898 | A | 4/2015 |
| JP | 2015-108609 | A | 6/2015 |
| KR | 10-2002-0066775 | A | 8/2002 |
| KR | 10-2012-0092924 | A | 8/2012 |
| KR | 101624453 | B1 | 5/2016 |
| TW | 201527601 | A | 7/2015 |
| WO | 2015-060250 | A1 | 4/2015 |

* cited by examiner

--PRIOR ART--

US 11,935,666 B2

APPARATUS FOR PURIFYING NUCLEAR REACTOR COOLANT FROM RADIOACTIVE MATERIALS AND ADJUSTING COOLANT PH

CROSS-REFERENCE TO RELATED APPLICATIONS

This application is a 371 of PCT/KR2017/005540, filed May 26, 2017 which claims the benefit of Korean Patent Application No. 10-2017-0033117, filed Mar. 16, 2017, the contents of each of which are incorporated herein by reference.

TECHNICAL FIELD

The present invention relates to an apparatus and a method for purifying a reactor coolant radioactive material and adjusting the pH of the reactor coolant, and more particularly to an apparatus and method of purifying a reactor coolant system by recovering radioactive material present in the reactor coolant and of adjusting the pH of the reactor coolant.

BACKGROUND ART

Generally, a nuclear power plant system is largely classified into three systems: a primary system (4xx) which is a facility system related to nuclear steam; a secondary system (5xx) which is a facility system related to a turbine generator; and a balance-of-plant system which is a class including auxiliary facility systems of the primary system and the secondary system. Alternatively, it is also classified into a nuclear steam-related system, a turbine generator-related system, and an electrical system.

Here, the nuclear steam supply system is the core system of the nuclear power plant, which uses light water as a moderator and a coolant and generates steam through a steam generator by absorbing heat from the fuel bundle in a nuclear reactor. It comprises: a reactor coolant system (RCS) that circulates pressurized cooling water and transfers nuclear reaction heat generated in the reactor core to the steam generator; a chemical and volume control system (CVCS) that controls the chemical composition and volume of the coolant sent from the reactor coolant system to maintain proper purity; a safety injection (SI) system that injects the neutron absorber material boric acid solution and emergency cooling water during postulated accident events such as a loss-of-coolant accident; a fuel handling (HI) system (FH); and an instrumentation and control system.

During the operating period of the nuclear power plant, metal ions or particles generated by wear and corrosion of the coolant system are adsorbed on the surface of the fuel coating material, and then converted into radioactive materials by neutron irradiation and accumulated in a low-flow-rate portion while passing again through the coolant system, thereby raising the energy level of the system. For this reason, the nuclear power plant is designed such that a mixed-bed ion-exchange resin column is provided in the chemical and volume control system so as to remove the radioactive materials. During this removal of the radioactive materials, a large amount of radioactive waste ion exchange resin is generated.

In addition, for pH adjustment of the reactor coolant, a large amount of expensive $Li^7OH$ is injected during operation of the nuclear reactor. However, during power operation of the nuclear reactor, a large amount of $Li^7$ is generated in the nuclear reactor. For this reason, the pH of the reactor coolant is adjusted by continuously removing a certain amount of $Li^7$ through a cation-exchange resin column, and hence radioactive waste ion exchange resin is generated.

Technology for purifying such radioactive materials is disclosed in Korean Patent Application Laid-Open Publication Nos. 2002-0066775 and 2012-0092924.

Meanwhile, as shown in FIG. 1, a conventional chemical and volume control system (CVCS) comprises: a regenerative heat exchanger configured to heat-exchange a high-temperature reactor coolant discharged from a reactor coolant system; a non-regenerative heat exchanger 20 configured to heat-exchange the reactor coolant, discharged from the regenerative heat exchanger 10, with component cooling water; a plurality of mixed-bed demineralizers 30 packed with cation- and anion-exchange resins therein and configured to remove radioactive materials (Cr-51, Co-58, Co-60, I-131, etc.) from the reactor coolant; a cation demineralizer 40 packed with cation-exchange resin and configured to adjust the pH of the reactor coolant by removing lithium from the reactor coolant; and a volume control tank 50 configured to store the reactor coolant demineralized through the mixed-bed demineralizers 30 and the cation demineralizer 40 and to supply the coolant to the nuclear reactor via the regenerative heat exchange 10. Meanwhile, the cation demineralizers 40 and the mixed-bed demineralizers 30 are connected in parallel to one another on a connection line between the non-generative heat exchanger 20 and the volume control tank 50, and function both to remove radioactive materials from the reactor coolant discharged from the non-regenerative heat exchanger 20 and to adjust the pH of the reactor coolant. In addition, a bypass line LR is connected in parallel to the cation demineralizer 40 and the mixed-bed demineralizers 30, so that the reactor coolant may be supplied directly to the volume control tank 50 without stopping operation of the chemical and volume control tank (CVCS) when operations such as maintenance or resin replacement are required.

However, purification and Li adjustment of the reactor coolant by ion-exchange resins according to the conventional art have the following disadvantages.

First, since the ion exchange resins can hardly remove metal particles other than ionic materials, the adsorbed metal particles get out of the resin layer after a certain time and flow into the reactor coolant, thus raising the radioactivity level of the coolant system. Second, since large amounts of the ion-exchange resins are used to remove small amounts of radioactive materials and Li ions, large amounts of radioactive waste ion-exchange resins are generated, and since there is still no stable isolation and disposal method for radioactive waste ion exchange resins, enormous costs are required for temporary isolation. Third, there is a problem in that replacement of waste ion-exchange resins generates a large amount of reactive process wastewater, and also excessively increases the process time and increases the radiation exposure of workers. Fourth, there is a problem in that expensive LiOH should be used, thus increasing the operating cost.

DISCLOSURE

Technical Problem

The present invention has been made in view of the above-described problems, and an object of the present invention is to provide an apparatus and a method for purifying reactor coolant radioactive material and adjusting the pH of the reactor coolant, in which the apparatus and the method are capable of replacing and overcoming the disadvantages of the purification and Li adjustment of a reactor coolant by conventional ion-exchange resins, that is, the problem that since the ion exchange resins can hardly remove metal particles other than ionic materials, the adsorbed metal particles get out of the resin layer after a certain time and flow into the reactor coolant, thus increasing the radioactivity level of the coolant system, the problem that since large amounts of the ion-exchange resins are used to remove small amounts of radioactive materials and Li ions, large amounts of radioactive waste ion-exchange resins are generated, and since there is still no stable isolation and disposal method for radioactive waste ion exchange resins, enormous costs are required for temporary isolation, and the problem that replacement of waste ion-exchange resins generates a large amount of reactive process wastewater, and also excessively increases the process time and increases the radiation exposure of workers.

Another object of the present invention is to provide an apparatus and a method for purifying reactor coolant radioactive material and adjusting the pH of the reactor coolant, in which the apparatus and the method make it possible to concentrate, store and reuse $Li^7$, which is naturally produced in a nuclear reactor during power operation, without injecting expensive LiOH obtained by removing $Li^6$ and concentrating only $Li^7$.

Still another object of the present invention is to provide an apparatus and a method for purifying reactor coolant radioactive material and adjusting the pH of the reactor coolant, in which the apparatus and the method make it possible to solve the problem that lithium ($Li^+$) ions used as a pH adjusting agent are removed together with radioactive metal ion materials, which is an adverse effect occurring when the lithium ions are applied to a reactor coolant purification apparatus.

Technical Solution

To achieve the above objects, the present invention provides an apparatus for purifying reactor coolant radioactive material and adjusting the pH of the reactor coolant, in which the apparatus is applied to a chemical and volume control system (CVCS) comprising a regenerative heat exchanger 10, a non-regenerative heat exchanger 20 and a volume control tank 50, and is provided between the non-regenerative heat exchanger 20 and the volume control tank 50 in the moving path of the reactor coolant, the apparatus comprising: a radioactive metal ion recovery unit 110 comprising a first negative electrode member 112 having a negative (−) electrode connected thereto and a first positive electrode member 114 having a positive (+) electrode connected thereto, the radioactive metal ion recovery unit 110 being configured such that the reactor coolant discharged from the non-generative heat exchanger 20 passes between the first negative electrode member 112 and the first positive electrode member 114, through which DC power flows, so that radioactive metal ions and metal particles are recovered while being deposited on the first negative electrode member 112; an Li ion separation/concentration unit 120 comprising a second positive electrode 124 having a positive (+) electrode connected to one side, a second negative electrode member 122 having a positive (−) electrode connected to the other side, and a cation-exchange membrane 126 provided between the second positive electrode member 124 and the second negative electrode member 122 and configured to pass a cation therethrough, the Li ion separation/concentration unit 120 being configured such that the reactor coolant that passed through the radioactive metal ion recovery unit 110 passes between the second positive electrode member 124 and the cation-exchange membrane 126 and flows into the volume control tank 50, and pure water is continuously recycled between the second negative electrode member 122 and the cation-exchange membrane 126, so that $Li^+$ ions, produced in the reactor coolant and passed through the cation-exchange membrane 126, move toward the second negative electrode member 122 and are separated; and an $Li^7$ concentration tank 130 configured to concentrate $Li^7$ in a recycling process in which $Li^7$ separated from the Li ion separation/concentration unit 120 is recycled again to the Li ion separation/concentration unit 120.

Here, DC power may be intermittently applied to the radioactive metal ion recovery unit 110 at a predetermined cycle.

Furthermore, a portion of the $Li^7$ ions, which are stored in the Li ion separation/concentration unit 120 and the $Li^7$ concentration tank 130 and circulated, may be supplied to the volume control tank 50 by introduction of LiOH concentrated water getting out of the Li ion separation/concentration unit 120.

Meanwhile, the first negative electrode member 112 of the radioactive metal ion recovery unit 110 has a closed structure with a shielded exterior, and the first positive electrode member 114 may be replaceably mounted in the first negative electrode member 112.

In addition, when demineralizers 30 and 40, which adjust the pH by Li removal while removing the radioactive material by ion exchange, are disposed between the non-generative heat exchanger 20 and the volume control tank 50 in the moving path of the reactor coolant, the reactor coolant that passed through the non-regenerative heat exchanger 20 may be supplied to the radioactive metal ion recovery unit 110 through a bypass line without passing through the demineralizers 30 and 40.

The present invention also provides a method for purifying reactor coolant radioactive material and regulating the pH of the reactor coolant, in which the method is applied to a chemical and volume control system (CVCS) comprising a regenerative heat exchanger 10, a non-regenerative heat exchanger and a volume control tank, and is used to purify reactor coolant radioactive material and adjust the pH of the reactor coolant, the method comprising the steps of: passing the reactor coolant, discharged from the non-regenerative heat exchanger 20, between a first negative electrode member 112 and first positive electrode member 114 of a radioactive metal ion recovery unit 110, through which a DC current flows, thereby recovering radioactive metal ions and metal particles by deposition on the first negative electrode member 112; passing the reactor coolant, passed through the radioactive metal ion recovery unit 110, between a second negative electrode member 124 and cation-exchange membrane of an Li ion separation/concentration unit 120, so as to be introduced into the volume control tank 50, and continuously recycling pure water between the second positive electrode member 122 and the cation-exchange membrane 126, so that $Li^+$ ions, produced in the reactor coolant and passed through the cation-exchange membrane 126, move toward the second negative electrode member 122 and are separated; concentrating $Li^7$ separated from the Li ion separation/concentration unit 120, in an $Li^7$ concentration tank 130 in a recycling process; and supplying $Li^7$, stored in the $Li^7$ concentration tank 130, to the volume control tank 50, thereby injecting the $Li^7$ into the reactor coolant.

Here, when the step of recovering the radioactive metal ions and metal particles is performed, DC power may be intermittently applied to the radioactive metal ion recovery unit 110 at a predetermined cycle.

At this time, when the step of recovering the radioactive metal ions and metal particles is performed, the intermittent application of the DC power may comprise repeating 1 minute of intermittent DC power application and 5 to 10 seconds of pause.

Advantageous Effects

According to the present invention, ion-exchange resins for purifying reactor coolant radioactive material and adjusting the pH of the reactor coolant are not used, and thus radioactive waste resins are not generated. In addition, a large amount of process wastewater for replacement of the ion-exchange resins is not generated, and thus radioactive waste may be significantly reduced. Furthermore, the apparatus of the present invention may be added to a conventional chemical and volume control system and used instead of mixed-bed demineralizers and a cation demineralizer, thus making it possible to achieve radioactive material removal and pH adjustment without having to use the mixed-bed demineralizers and the cation demineralizer.

In addition, according to the present invention, unlike a conventional ion-exchange resin method capable of removing only ionic materials, even metal particles may be removed, thus reducing the amount of metal particles introduced into the reactor core. This can reduce the amount of radioactive material produced in the reactor core by neutron irradiation.

Furthermore, according to the present invention, only a negative electrode having radioactive material deposited thereon should be separated and isolated, but the total amount of radioactive metals and ions generated during one cycle is as small as a few grams or less. Thus, the apparatus of the present invention can remove radioactive materials for almost a lifetime after installed once.

In addition, according to the present invention, only Li ions generated during output operation are concentrated and reused when necessary. Thus, concentrated Liz may be reused without purchasing expensive LiOH that relies on import.

BEST MODE

The above objects, features and other advantages of the present invention will become more apparent by describing preferred embodiments of the present invention in detail with reference to the accompanying drawings. Hereinafter, an apparatus and a method for purifying reactor coolant radioactive material and adjusting the pH of the reactor coolant according to embodiments of the present invention will be described in detail with reference to the accompanying drawings.

Figure 1:
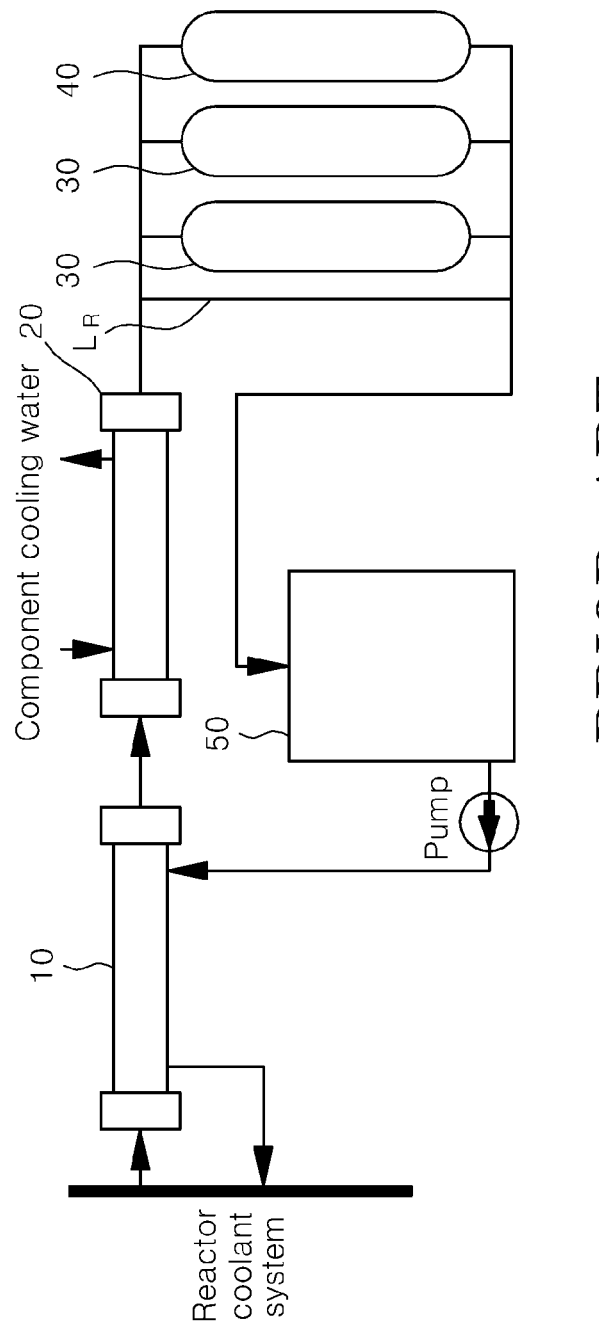
FIG. 1 is a schematic view showing a conventional chemical and volume control system.
Figure 2:
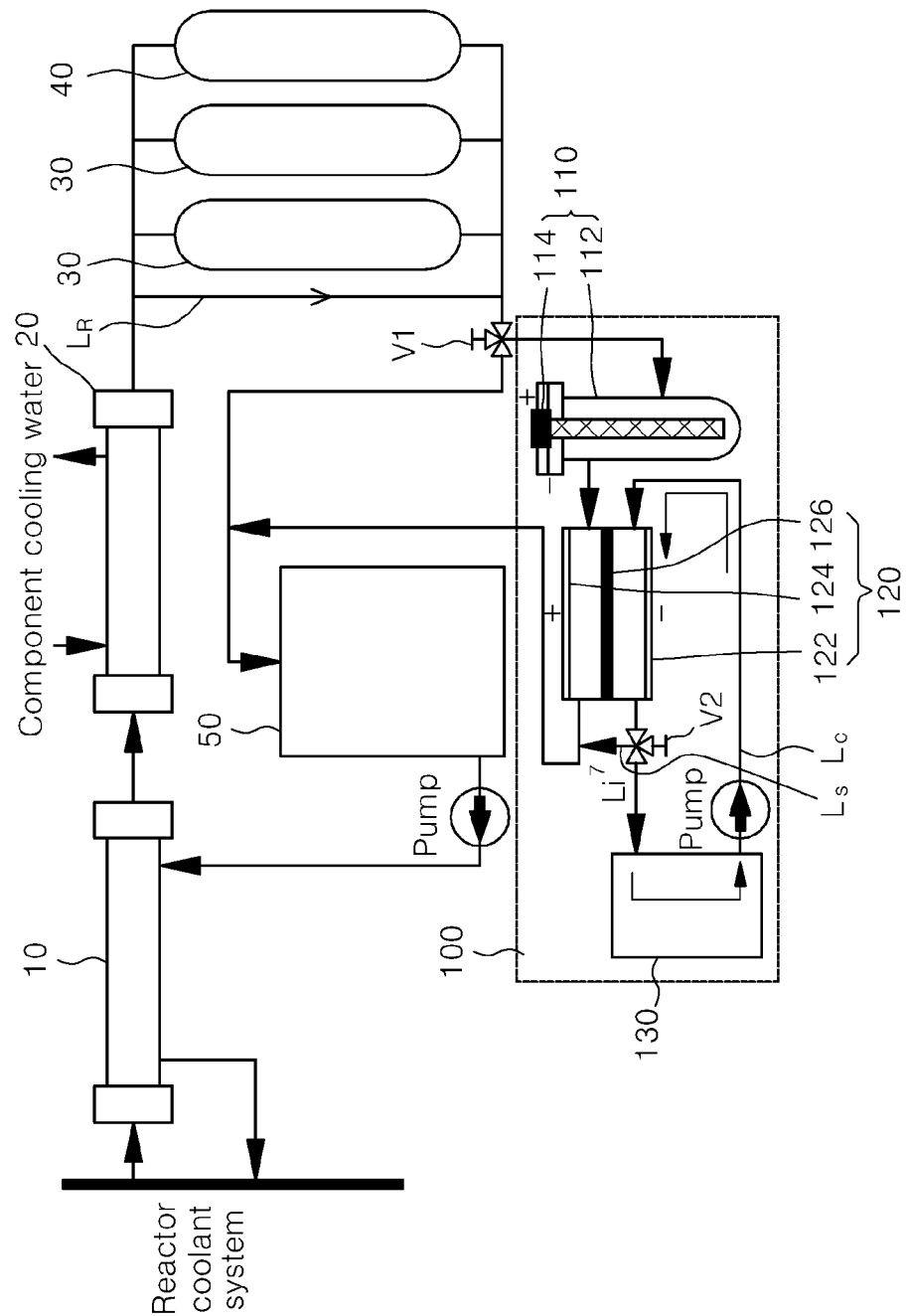
FIG. 2 is a schematic view showing a state in which the present inventive apparatus for purifying reactor coolant reactive material and regulating the pH of the reactor coolant is applied to a novel chemical and volume control system.

Referring to FIG. 2, the present inventive apparatus 100 for purifying reactor coolant radioactive material and adjusting the pH of the reactor coolant comprises a radioactive metal ion recovery unit 110, an Li ion separation/concentration unit 120, an Liz concentration tank 130 and a control unit, and is disposed between a non-generative heat exchanger 20 and a volume control tank 50 in the moving path of the reactor coolant in the conventional chemical and volume control system (CVCS).

Here, the reactor coolant which is moving from a reactor coolant system to the chemical and volume control system CVCS is in a high-temperature state. The high-temperature reactor coolant reduces the possibility of thermal shock to the reactor coolant system by heating and temperature-raising a low-temperature reactor coolant which is being returned to the reactor coolant system from the chemical and volume control system (CVCS) through the regenerative heat exchanger 10.

The reactive metal ion recovery unit 110 is a purification unit provided in the outlet line of the non-regenerative heat-exchanger 20 and replacing the function of the mixed-bed demineralizers 30 in the conventional chemical and volume control system. It is configured to remove radioactive materials from the reactor coolant.

Specifically, the radioactive metal ion recovery unit 110 uses the principle of electroplating instead of a conventional ion-exchange resin column. When the reactor coolant is passed between a first negative electrode member 112 and a first positive electrode member 114, through which direct current power flows, not only radioactive metal ions but also metal particles are separated by deposition on the first negative electrode member 112.

In this regard, electrochemical plating is an application technology of recovering radioactive metal ions present in water by using the principle that the metal ions are deposited (plated) on the negative electrode during passage of DC power through an electrolyte solution.

Here, the first negative electrode member 112 of the radioactive metal ion recovery unit 110 is an exterior-forming body to which a negative (−) electrode is connected, and the exterior thereof is shielded by continuous deposition of metallic radioactive material.

In addition, the first negative electrode member 112 should be easily separated for replacement. However, since the volume of the radioactive material deposited is very small, the first negative electrode member 112 may be used for almost a lifetime.

The first positive electrode member 114 is replaceably provided in the first negative electrode member 112 when the electrode is damaged by ionization. Since metal ions are ionized thereon, the first negative electrode member 114 should be made of a platinum black plating or a conductor material such as titanium or carbon material. As a result, the first positive electrode member 114 is separated from the first negative electrode member 112 for new replacement due to over-deposition of radioactive metal particles or ionization loss of the first positive electrode member 114.

Thus, the radioactive metal ion recovery unit 110 may prevent metal particles from being converted into radioactive material while being introduced into the nuclear reactor and being radiated, thereby significantly reducing the radioactive material in the reactor coolant. In addition, as the first negative electrode member having metal ions deposited thereon is separated and isolated, the volume of the radioactive material recovered may be minimized, and also radioactive process wastewater resulting from separation of the first negative electrode member 112 is not substantially generated. Furthermore, the first negative electrode member may be safely isolated in the form of metal having the most stable minimum volume while minimizing the radiation exposure of workers.

Meanwhile, as a solution to the adverse effect of application of the radioactive material purification application, DC power is intermittently applied to the radioactive metal ion recovery unit 110 by a control unit (not shown) in order to solve the problem that lithium ions (Li$^+$) which need to be continuously maintained at a predetermined concentration are also removed by deposition on the first negative electrode member 112.

Through this process of intermittently applying DC power, lithium capable of easily dissolving in aqueous solution may be maintained at a predetermined concentration by easy dissolution in the reactor coolant when no current flows. However, other radioactive materials may be isolated by continuous deposition on the first negative electrode member 112 without being dissolved into metal ions.

Specifically, when conventional reactor coolant blowdown water is passed between the first negative electrode member 112 and the first positive electrode member 114, through which a current flows, an iodine isotope which is an anionic radioactive material is deposited on the first positive electrode member 114, and radioactive isotopes (Cr, Co, etc.), which are cationic radioactive materials, and Li ion which is a material for adjusting the pH of the reactor coolant, are deposited together on the first negative electrode member 112.

However, lithium has a very high solubility, and hence the lithium ions deposited are immediately dissolved in the reactor coolant when no current flows. For this reason, when a current is intermittently applied to the reactor coolant in order to maintain a predetermined Li ion concentration, the Li ions deposited may be maintained at a predetermined concentration by easy dissolution on the reactor coolant, and Cr, Co, etc., which are radioactive materials, may be continuously maintained in a deposited state because they are very difficult to dissolve.

When a current is intermittently applied to the reactor coolant in order to maintain a predetermined Li ion concentration, about 1 minute of current application and 5 to 10 seconds of pause may be repeated. However, the intermittent application conditions are not limited thereto and may be changed.

In addition, an iodine isotope that may be deposited on the first positive electrode member 114 functions as a protective coating (supplementing electrons that are released from the metal) that protects the electrode that may be inevitably damaged by ionization of the metal due to the characteristics of the first negative electrode member 114. Although the conductivity of the electrode may be reduced due to deposition of a large amount of the iodine isotope, the iodine isotope is dissolved to restore its normal function when the current for maintaining the Li concentration is intermittently applied. At this time, the iodine isotope does not need to be removed, because it easily disappears due to its very short half-life.

Meanwhile, since the total amount of periodic removal of the radioactive metal particles and ions present in the reactor coolant is only a few grams, the radioactive metal ion recovery unit 110 of the inventive apparatus 100 for purifying reactor coolant radioactive material and adjusting the pH of the radioactive material may be used for almost a lifetime after installed once.

However, since the radioactivity level of the coolant system increases as the amount of radioactive materials deposited, shielding should be easily achieved. If the positive electrode member 114 is damaged, separation and replacement of the first positive electrode member 114 should be easily achieved so that the radiation exposure of workers can be minimized.

The Li ion separation/concentration unit 120 is a facility that replaces the function of the cation demineralizer in the conventional chemical and volume control system (CVCS), and functions to separate Liz produced in the reactor coolant that passed through the radioactive metal ion recovery unit 110. That is, the Li ion separation/concentration unit 120 is a facility based on a conventional electrodialysis system, and employs a two-electrode membrane as a cation-exchange membrane 126 to pass only cations therethrough.

At this time, the Li ion separation/concentration unit 120 comprises: a second positive electrode member 124 having a positive (+) electrode connected to one side; a second negative electrode member 122 having a negative (−) electrode connected to the other side; and a cation-exchange membrane 126 provided between the second positive electrode member 124 and the second negative electrode member 122 and configured to pass Li$^+$ ions therethrough and to retain boric acid ions ($BO_3^-$) for controlling reactivity in the reactor coolant.

As a result, when DC power is supplied to the Li ion separation/concentration unit 120 across the cation-exchange membrane employing an electrodialysis system so as to make it possible to remove and maintain the pH adjusting agent, such that a portion of the reactor coolant continues to flow toward the second positive electrode member 124 and pure water is continuously recycled to the second negative electrode member 122, Li ions that passed through the cation-exchange membrane move toward the second negative electrode member 122 and are concentrated. As the Li ions are concentrated as described above, Li ions produced in the nuclear reactor are removed. When the Li concentration in the reactor coolant increases, the pH of the reactor coolant may be adjusted by injecting the concentrated Li ions again into the reactor coolant.

That is, the Li ion separation/concentration unit 120 is connected to a Li$^7$ concentration tank 130 through a circulation line Lc so that the Li ions concentrated in the second negative electrode member 122 move to the Li$^7$ concentration tank 130. In addition, a supply line Ls is connected to a circulation line Lc so that the Li$^7$ ions that are circulated to the circulation line Lc may be supplied to the volume control tank 50 while a portion thereof may be introduced into an LiOH concentrated water.

Here, the supply line Ls is illustrated as being connected to the circulation line (Lc) and the inlet line of the volume control tank 50, but is not limited thereto and may also be selectively connected to the volume control tank 50 or the inlet line of the volume control tank 50 through the Li$^7$ concentration tank.

In addition, a three-way valve V2 is provided at an intersection between the circulation line Lc and the supply line Ls. The operation of the three-way valve V2 may be controlled by a control unit (not shown in the figure), thereby selectively controlling the moving path of the concentrated Li ions stored in the $Li^7$ concentration tank.

Furthermore, a pump is provided in each of the circulation line Lc and the line connecting between the volume control tank 50 and the regenerative heat exchanger 10 in order to forcibly transfer the Li ions and the reactor coolant.

In addition, the control unit may control intermittent current application to maintain a predetermined Li ion concentration in the reactor coolant being transferred from the Li ion separation/concentration unit 120, and may also control other operations.

Meanwhile, in the Li ion separation/concentration unit 120, the isolation membrane between the second negative electrode member 122 and the second positive electrode member 124 for adjusting the lithium concentration is composed of the cation-exchange membrane 126. Thus, only $Li^+$ ions are passed through the membrane and concentrated, and boric acid ions ($BO_3^-$) for controlling reactivity in the reactor coolant are maintained as they are.

The $Li^7$ concentration tank 130 stores therein the $Li^7$ concentrated during recycle of the $Li^7$ separated from the Li ion separation/concentration unit 120. If necessary, the supply line Ls is connected to the inlet line of the volume control tank 50 so that the $Li^7$-injected reactor coolant can be supplied to the volume control tank 50.

In addition, the $Li^7$ concentration tank 130 may be connected to the volume control tank 50 by a line so that the concentrated $Li^7$ stored therein can be supplied to the volume control tank 50.

The control unit (not shown in the figure) may control the operation of three-way valves V1 and V2, thereby controlling the moving path of Li ions by the opening and closing of the three-way valve V1 and controlling the moving path of the reactor coolant by the opening and closing of the three-way valve V2. In addition, the control unit may control necessary operations for the apparatus of the present invention, for example, the amount and time of current applied to the radioactive metal ion recovery unit 110 and the Li ion separation/concentration unit 120, driving of various pumps, etc.

Figure 3:
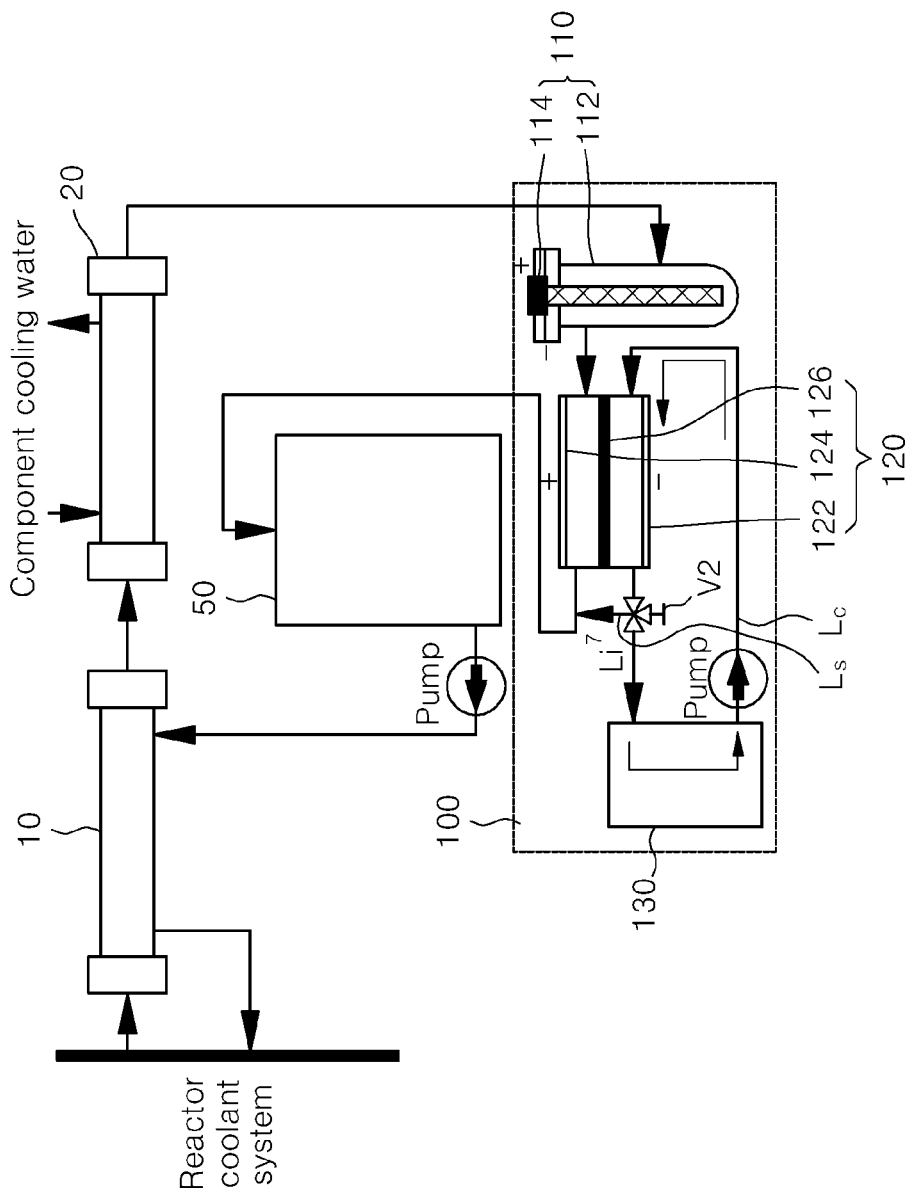
FIG. 3 is a schematic view showing a state in which the present inventive apparatus for purifying reactor coolant reactive material and regulating the pH of the reactor coolant is applied to a conventional chemical and volume control system.

Meanwhile, as shown in FIG. 3, when the present inventive apparatus for purifying reactor coolant radioactive material and adjusting the pH of the reactor coolant is applied to the conventional chemical and volume control system (CVCS), it comprises a bypass line $L_R$ that makes it possible to bypass the cation demineralizer 40 and the mixed-bed demineralizers 30 in the line connected between the non-generative heat exchanger 20 and the volume control tank 50, so that the reactor coolant heat-exchanged in the non-generative heat exchanger 20 will not be introduced into the mixed-bed demineralizers 30 and the cation demineralizer 40. In this case, a three-way valve V1 may be provided at an intersection between the outlet line of the non-regenerative heat exchanger 20 and the connection line connected to the radioactive metal ion recovery unit 110, so that the operation of the three-way valve V1 may be controlled by a control unit (not shown in the figure), thereby controlling the moving path of the reactor coolant discharged through the non-regenerative heat exchanger 20.

When the present inventive apparatus for purifying reactor coolant radioactive material and adjusting the pH of the reactor coolant is applied to the conventional chemical and volume control system (CVCS), the mixed-bed demineralizers 30 and the cation demineralizer 40 are not removed. The reason is because the cost for removal of the mixed-bed demineralizers 30 and the cation demineralizer 40 increases and radioactive waste (packed materials such as ion-exchange resins in various pipes and tanks) is generated.

Figure 4:
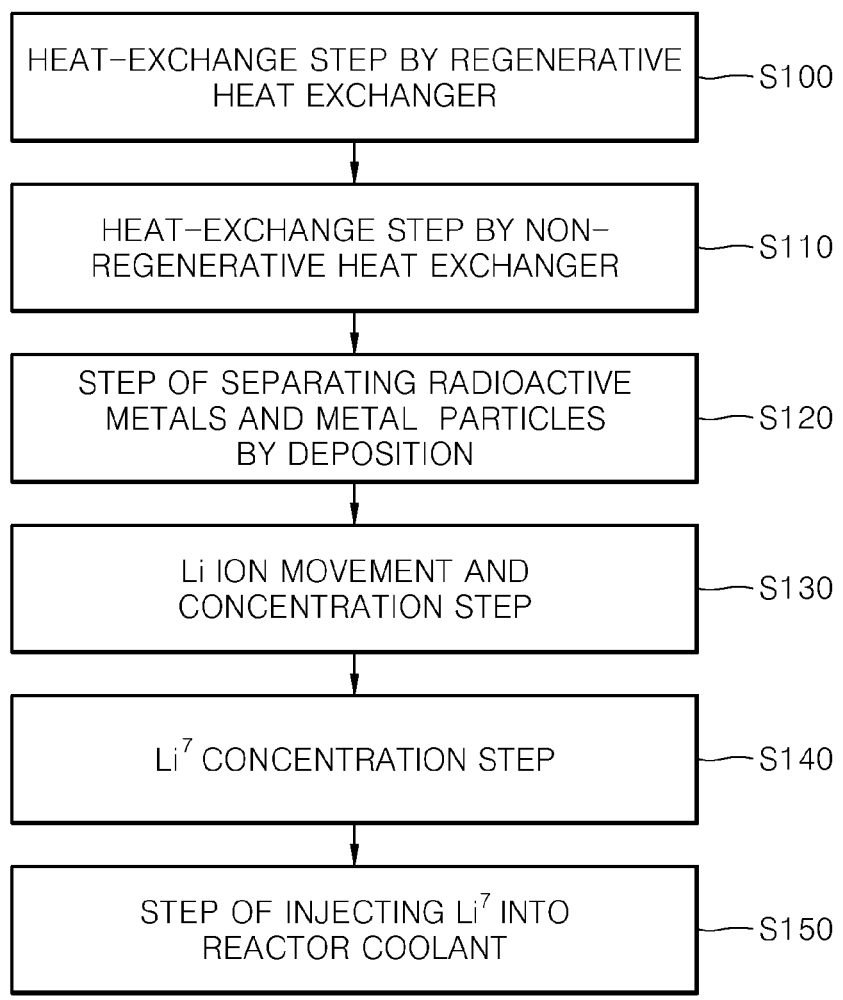
FIG. 4 is a block diagram showing an inventive method for purifying reactor coolant reactive material and regulating the pH of the reactor coolant is applied to a conventional chemical and volume control system.

Referring to FIG. 4, the present inventive method of purifying reactor coolant radioactive material and adjusting the pH of the reactor coolant by the present invention apparatus 100 for purifying reactor coolant radioactive material and adjusting the pH of the reactor coolant comprises: (S100) a heat-exchange step by a regenerative heat exchanger; (S110) a heat-exchange step by a non-regenerative heat exchanger; (S120) a step of directly separating radioactive metals and metal particles; (S130) an Li ion movement and concentration step; (S140) an $Li^7$ concentration step (S140); and (S150) a step of injecting $Li^7$ into a nuclear reactor.

The heat-exchange step (S100) by the regenerative heat exchanger is a step of heat-exchanging a high-temperature reactor coolant, discharged from a reactor coolant system, through the regenerative heat exchanger 10.

The heat-exchange step (S110) by the non-regenerative heat exchanger is a step of heat-exchanging the reactor coolant, discharged from the regenerative heat exchanger, through component cooling water and the non-regenerative heat exchanger 20.

The step (S120) of directly separating radioactive metals and metal particles is a step of passing the reactor coolant, discharged from the non-regenerative heat exchanger 20, between the first negative electrode member 112 and first positive electrode member 114 of the radioactive metal ion recovery unit 110, through which a DC current flows, thereby allowing the radioactive metals and metal particles to be separated while being deposited on the first negative electrode member 112.

That is, in the step (S120) of directly separating the radioactive metals and metal particles, radioactive cationic materials (Co, Cr, etc.) are removed by deposition on the first negative electrode member 112 while the reactor coolant passes between the first negative electrode member 112 and the first positive electrode member 114, through which a DC current flows.

Meanwhile, since Li ions and boric acid ions that may be deposited on the first positive electrode member 114 are easy to dissolve, these ions are retained in the reactor coolant by an intermittent current flow provided by a control unit, so that they can replace the mixed-bed demineralizers 30 in the conventional chemical and volume control system (CVCS) which is used for purification of the reactor coolant.

Consequently, the step (S120) of directly separating the radioactive metals and metal particles comprises a step of recovering the radioactive metals and metal particles. In the step of recovering the radioactive metal ions and metal particles, as a solution to the adverse effect of application of the radioactive material purification apparatus, DC power is intermittently applied to the radioactive metal ion recovery unit 110 by a control unit in order to solve the problem that lithium ions ($Li_+$) which need to be continuously maintained at a predetermined concentration in the reactor coolant are also removed by deposition on the negative electrode.

Through this process of intermittently applying DC power, lithium capable of easily dissolving in aqueous solution may be maintained at a predetermined concentration by easy dissolution in the reactor coolant when no current flows. However, other radioactive metals may be isolated by continuous deposition on the negative electrode without being dissolved into metal ions.

Specifically, when conventional reactor coolant blowdown water is passed between the first negative electrode member 112 and the first positive electrode member 114, through which a current flows, an iodine isotope which is an anionic radioactive material is deposited on the first positive electrode member 114, and radioactive isotopes (Cr, Co, etc.), which are cationic radioactive materials, and Li ion which is a material for adjusting the pH of the reactor coolant, are deposited together on the first negative electrode member 112.

However, lithium has a very high solubility, and hence the lithium ions deposited are immediately dissolved in the reactor coolant when no current flows. For this reason, when a current is intermittently applied in order to maintain a predetermined Li ion concentration to the reactor coolant, the Li ions deposited may be maintained at a predetermined concentration by easy dissolution in the reactor coolant, and Cr, Co, etc., which are radioactive materials, may be continuously maintained in a deposited state because they are very difficult to dissolve.

When a current is intermittently applied to maintain a predetermined Li ion concentration in the reactor coolant during the step of recovering the radioactive metal ions and metal particles, about 1 minute of current application and 5 to 10 seconds of pause may be repeated. However, the intermittent application conditions are not limited thereto and may be changed.

The Li ion movement and concentration step (S130) is a step of allowing Li ions to move toward the second negative electrode member 122 and be concentrated while the reactor coolant that passed through the radioactive metal ion recovery unit 110 passes through the DC power-supplied cation-exchange membrane in the Li ion separation/concentration unit 120.

More specifically speaking, in the Li ion movement and concentration step (S130), the coolant is allowed to continuously flow to the second positive electrode member 124 by application by an electrodialysis system, and the isolation membrane is composed of the cation-exchange membrane 126 so that only Li ions may be separated and concentrated on the second negative electrode member 122. Thus, if necessary, the Li ions are injected again into the reactor coolant. Accordingly, the Li ions replace the function of the cation demineralizer 40 in the conventional chemical and volume control system, and also eliminate the need to import expensive $Li^7OH$, which relies on import and needs to be injected during power plant startup. Thus, the power plant can be economically operated.

The $Li^7$ concentration step (S140) is a step of concentrating $Li^7$, separated from the Li ion separation/concentration unit 120, in the $Li^7$ concentration tank 130 during a recycling process.

The step (S150) of injecting $Li^7$ into the reactor coolant is a step of injecting $Li^7$, stored in the $Li^7$ concentration tank, into the reactor coolant so that the $Li^7$ may be reused in the regenerative heat exchanger 10.

As described above, considering the fact that large amounts of radioactive waste resins are generated to control the concentrations of small amounts of radioactive materials and lithium and that waste resins are accumulated in the power plant due to the absence of a method for disposal and isolation of these waste resins, the present inventive method for adjusting reactor coolant radioactive material and adjusting the pH of the reactor coolant intends to purify the reactor coolant by removing radioactive materials from the reactor coolant without generating radioactive waste resin and to properly separate, concentrate and reuse Li ions as a pH-controlling agent.

Although the preferred embodiments of the present invention have been described above, the scope of the present invention is not limited to the above-described specific embodiments. That is, those skilled in the art to which the present invention pertains will appreciate that many changes and modifications of the present invention are possible without departing from the spirit and scope of the appended claims, and all such appropriate changes and modifications should be considered to be within the scope of the present invention.

INDUSTRIAL APPLICABILITY

The present invention relates to an apparatus and a method, which are provided in a nuclear power plant and used to purify radioactive materials in a reactor coolant and adjust the pH of the reactor coolant. The present invention is industrially applicable.

The invention claimed is:

1. An apparatus for purifying $Li^7$ ions from reactor coolant of radioactive material and adjusting pH of the reactor coolant comprising:
a radioactive metal ion recovery unit comprising a first negative electrode member having a negative (−) electrode connected thereto and a first positive electrode member having a positive (+) electrode connected thereto, the radioactive metal ion recovery unit being configured such that the reactor coolant passes between the first negative electrode member and the first positive electrode member so that radioactive metal ions and metal particles are recovered when deposited on the first negative electrode member;
an Li ion separation/concentration unit comprising a second positive electrode member having a positive (+) electrode connected to one side of the Li ion separation/concentration unit, a second negative electrode member having a negative (−) electrode connected to the other side of the Li ion separation/concentration unit, and a cation-exchange membrane provided between the second positive electrode member and the second negative electrode member and configured to pass a cation therethrough, the Li ion separation/concentration unit being configured such that the reactor coolant that passed through the radioactive metal ion recovery unit passes between the second positive electrode member and the cation-exchange membrane, and pure water is continuously recycled between the second negative electrode member and the cation-exchange membrane so that $Li^7$ ions produced in the reactor coolant pass through the cation-exchange membrane, move toward the second negative electrode member, react with the pure water to form LiOH concentrated water, and are separated from the reactor coolant; and
an $Li^7$ concentration tank,
a first flow path connecting the Li ion separation/concentration unit to the $Li^7$ concentration tank,
a second flow path connecting the $Li^7$ concentration tank to the Li ion separation/concentration unit, and
a power supply configured to apply DC power to the radioactive metal ion recovery unit,
wherein the $Li^7$ concentration tank is configured to concentrate $Li^7$ in a recycling process in which $Li^7$ received in the $Li^7$ concentration tank from the Li ion separation/concentration unit via the first flow path is recycled again to the Li ion separation/concentration unit via the second flow path,
wherein the first negative electrode member of the radioactive metal ion recovery unit has a closed structure with a shielded exterior, and the first positive electrode member is replaceably mounted in the first negative electrode member, wherein the DC power is intermittently applied to the radioactive metal ion recovery unit at a predetermined cycle so as to maintain a predetermined concentration level of Li ions in the reactor coolant by reintroducing Li ions to the reactor coolant.

2. A chemical and volume control system (CVCS) comprising a regenerative heat exchanger,
a non-regenerative heat exchanger,
a volume control tank,
and the apparatus of claim 1,
wherein the apparatus is provided between the non-regenerative heat exchanger and the volume control tank in a moving path of the reactor coolant,
wherein the reactor coolant that passed through between the second positive electrode member and the cation-exchange membrane of the Li ion separation/concentration unit flows into the volume control tank.

3. The system of claim 2, further comprising a third flow path connecting the first flow path to the volume control tank, wherein a portion of the LiOH concentrated water formed in the Li ion separation/concentration unit is introduced to the volume control tank via the third flow path in order to supply $Li^7$ ions to the reactor coolant.

4. The system of claim 2, further comprising demineralizers which adjust the pH of the reactor coolant by Li removal disposed between the non-regenerative heat exchanger and the volume control tank in the moving path of the reactor coolant.

5. The system of claim 4, further comprising a bypass line through which the reactor coolant that passes through the non-regenerative heat exchanger is supplied to the radioactive metal ion recovery unit without passing through the demineralizers.

* * * * *